United States Patent [19]
Berke

[11] Patent Number: 5,980,035
[45] Date of Patent: *Nov. 9, 1999

[54] MIRRORIZED COMPARTMENTS FOR A DRIVER'S MASK

[76] Inventor: Joseph J. Berke, 2063 Long Lake Shore, West Bloomfield, Mich. 48323

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/088,693

[22] Filed: Jun. 1, 1998

Related U.S. Application Data

[62] Division of application No. 08/630,072, Apr. 15, 1996, Pat. No. 5,764,334.

[51] Int. Cl.$^6$ .................................................. G02C 7/14
[52] U.S. Cl. ................................. 351/43; 351/50
[58] Field of Search .................... 351/43, 50, 41, 351/158, 57, 47; 2/442, 430

[56] References Cited

U.S. PATENT DOCUMENTS 5,170,190  12/1992  Berke .
5,216,454  6/1993  Berke .
5,420,649  5/1995  Lewis .

FOREIGN PATENT DOCUMENTS 359601  3/1906  France .
302833  12/1928  United Kingdom .

*Primary Examiner*—Hung Xuan Dang
*Attorney, Agent, or Firm*—Alex Rhodes

[57] ABSTRACT

Mirrorized compartments for extending a diver's vertical, lateral and posterior fields of vision. The mirrorized compartments are clamped on opposite sides of the diving mask and have mirrorized surfaces which reflect light rays entering the compartments from objects above, below, the sides or rear of the mask into a diver's view. In a first aspect of the invention, the mirrorized surfaces are fixed to provide supplementary lateral and posterior fields of vision of fixed amounts. In a second aspect of the invention, the mirrorized surfaces are rotatable about horizontal axes to provide supplementary vertical or lateral and posterior fields of vision in varying amounts. In a third aspect of the invention, the mirrorized surfaces are on members which are rotatable with spherical joints to provide supplementary vertical, lateral and posterior fields of vision in varying amounts.

18 Claims, 7 Drawing Sheets

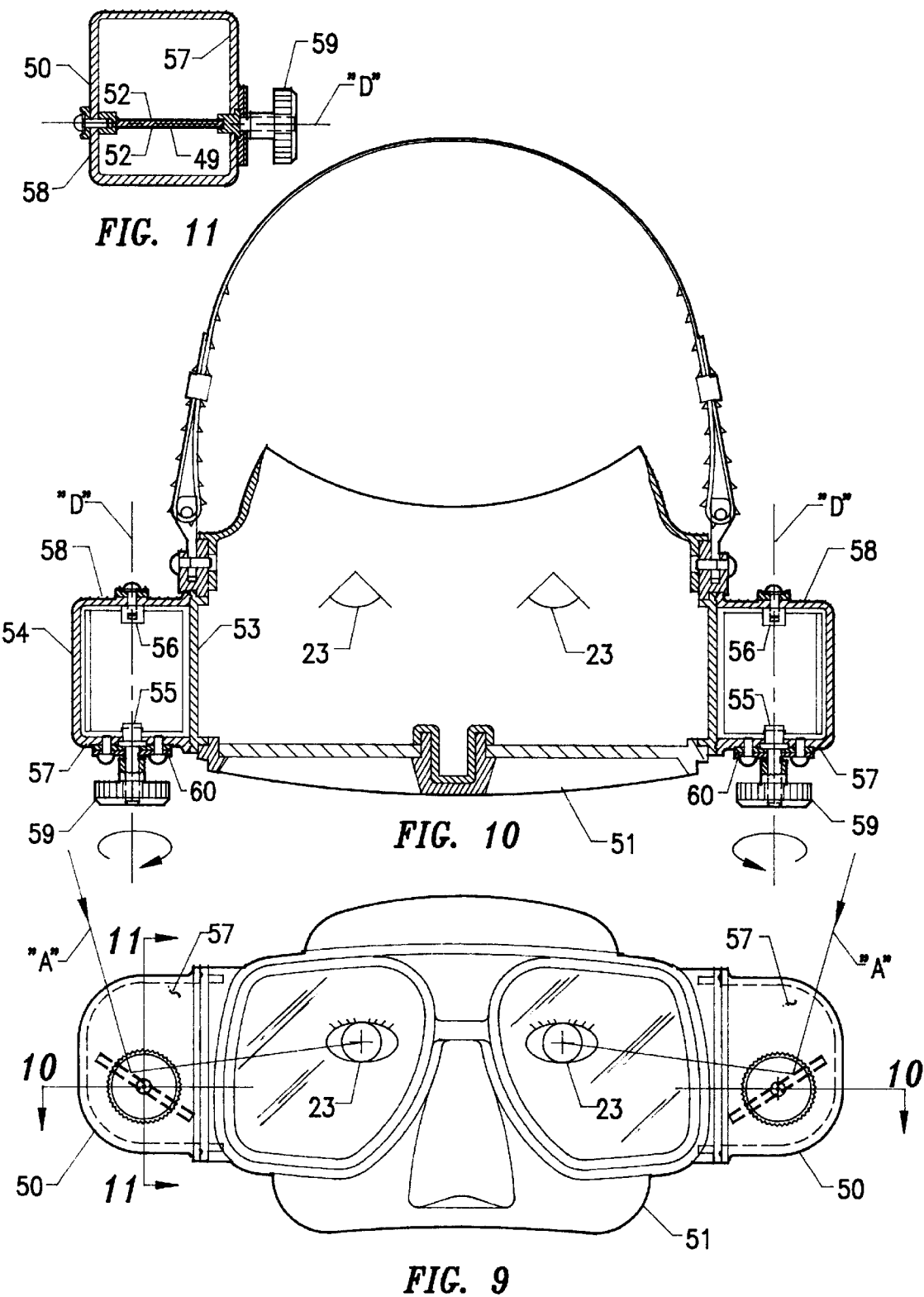

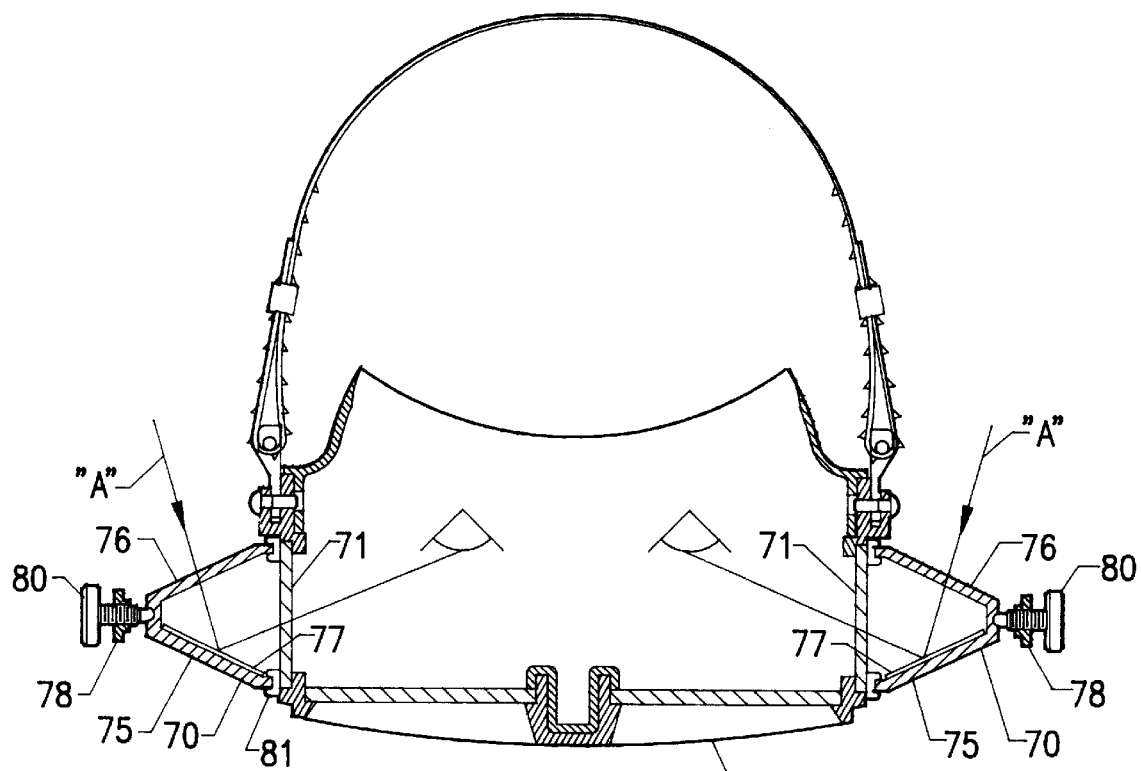
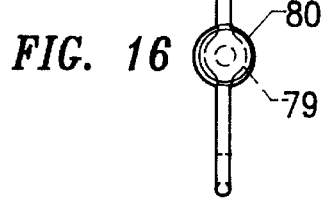
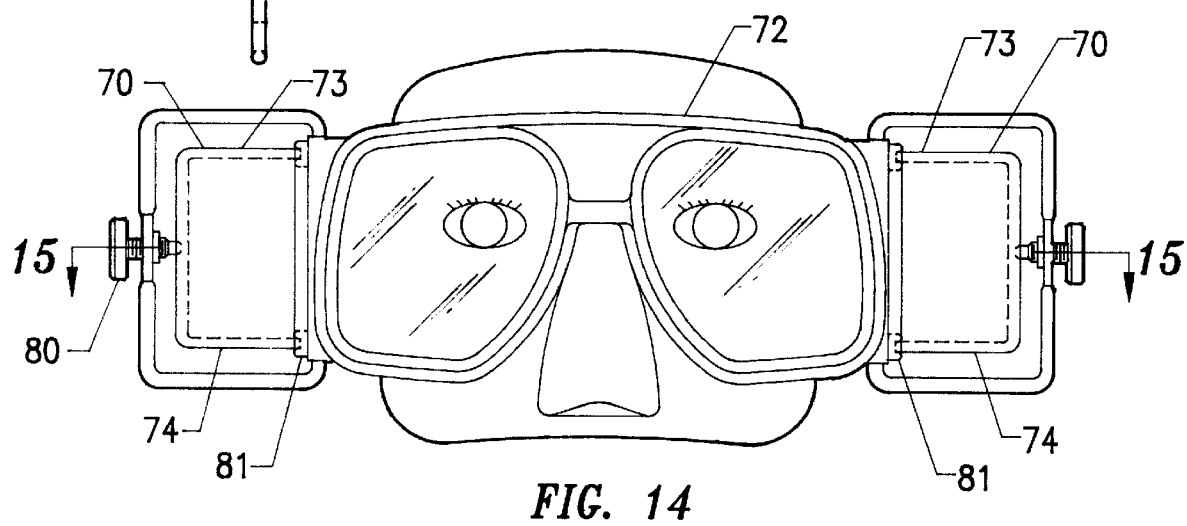

5,980,035

MIRRORIZED COMPARTMENTS FOR A DRIVER'S MASK

This application is a division of application Ser. No. 08/630,072, filed Apr. 15, 1996, now U.S. Pat. No. 5,764,334.

FIELD OF THE INVENTION

This invention relates to underwater diving masks and more particularly to a diving mask with detachable side compartments for supplemental vertical, lateral and posterior fields of vision.

BACKGROUND OF THE INVENTION

Diving masks are popular accessories for preventing contact of a diver's eyes and nose with water. They are frequently used with snorkels, mouthpieces, breathing regulators and air tanks.

Current masks require divers to turn and twist their heads and bodies and turn their eyes to avoid hazards, such as sharks, electric eels, and rocks and locate underwater objects. These movements are distracting, hinder a diver's forward motion, and cause fatigue.

SUMMARY OF THE INVENTION

The present invention is a development of my U.S. Pat. Nos. 5,170,190 and 5,216,454 which disclose divers' masks having optical prisms for supplementing a diver's field of vision.

One characteristic feature of the invention is that detachable compartments for mirrorized surfaces are used for supplementing a diver's forward field of vision. Another characteristic feature is that the mirrorized surfaces are located in sealed compartments. Another characteristic feature is that the expanse of the supplemental vertical, lateral and posterior fields of vision can be selectively adjusted.

One benefit of the invention is that eye movements and twisting and turning of a diver's head and body are substantially reduced and in some cases eliminated.

In a first aspect of the invention, a pair of mirrorized surfaces are provided in outward extending detachable compartments of a mask. The orientations of the mirrorized surfaces are fixed and the compartments are sealed to preserve the reflectance of the mirrorized surfaces.

In a second aspect of the invention, a pair of mirrorized reflectors are mounted for rotation about vertical or horizontal axes in sealed detachable compartments at end portions of a mask. The reflectors are selectively rotatable to supplement the diver's forward field of vision in varying amounts.

In a third aspect of the invention, a pair of mirrorized reflectors are mounted for rotation about spherical joints in sealed detachable compartments at end portions of a mask. The reflectors are selectively rotatable to supplement the diver's forward field of vision in varying amounts.

The foregoing features and benefits of the invention, together with additional aspects, features and benefits will be more apparent from the ensuing description and accompanying drawings which describe the invention in detail.

BRIEF DESCRIPTION OF THE DRAWINGS

The invention will be better understood and further objects, characteristic features, details and advantages thereof will appear more clearly with reference to the diagrammatic drawings illustrating a presently preferred specific embodiment of the invention by way of non-limiting example only.

FIG. 9 is a front view of an alternate embodiment which is selectively adjustable for supplementing a diver's vertical and posterior fields of vision.

FIG. 10 is a cross-sectional view taken on the line 10—10 in FIG. 9.

FIG. 11 is a cross-sectional view taken on the line 11—11 in FIG. 9.

FIG. 14 is an alternate embodiment consisting of a diver's mask with a pair of detachable compartments mounted to opposite ends of the mask.

FIG. 15 is a cross-sectional view taken on the line 15—15 in FIG. 14.

FIG. 16 is an end view of a wire retainer.

DETAILED DESCRIPTION OF A PREFERRED EMBODIMENT

Figure 1:
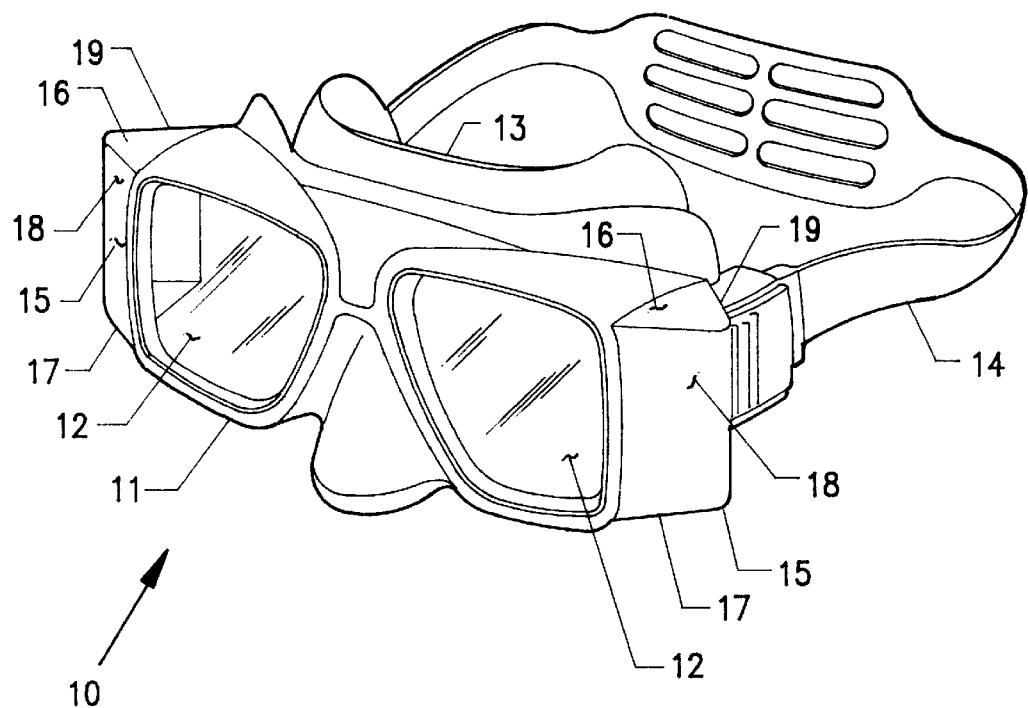
FIG. 1 is a perspective view of a diver's mask with sealed compartments for supplementing a diver's lateral and posterior fields of vision.
Figure 2:
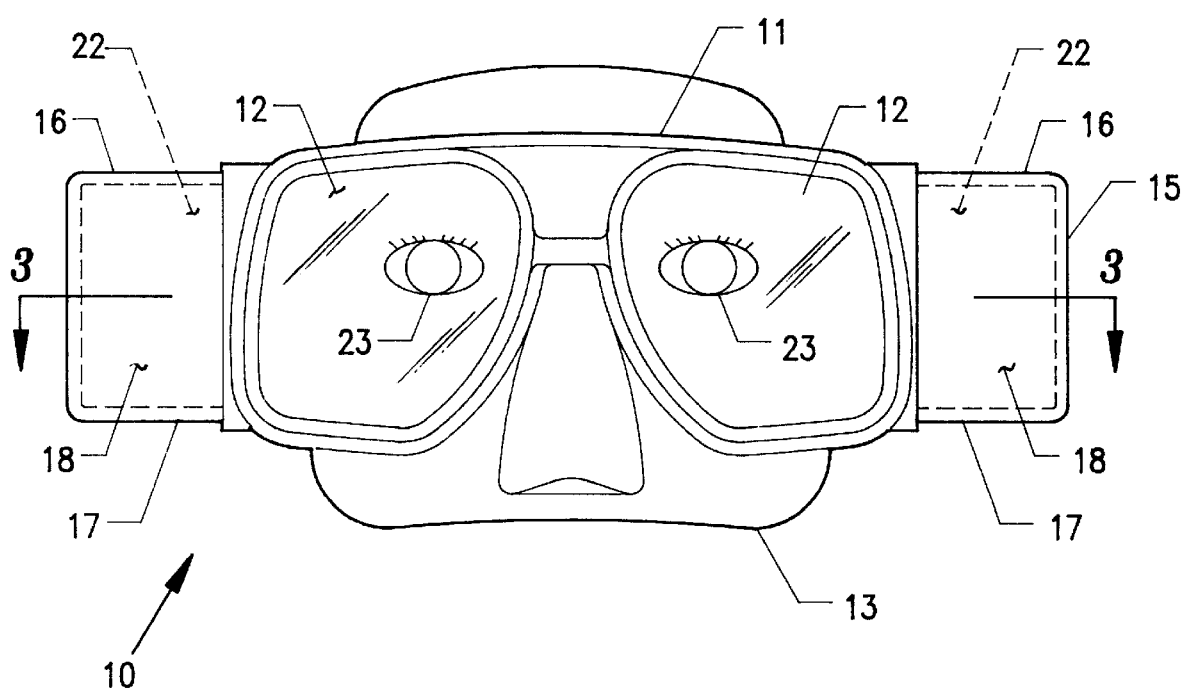
FIG. 2 is a front view of the diver's mask.
Figure 3:
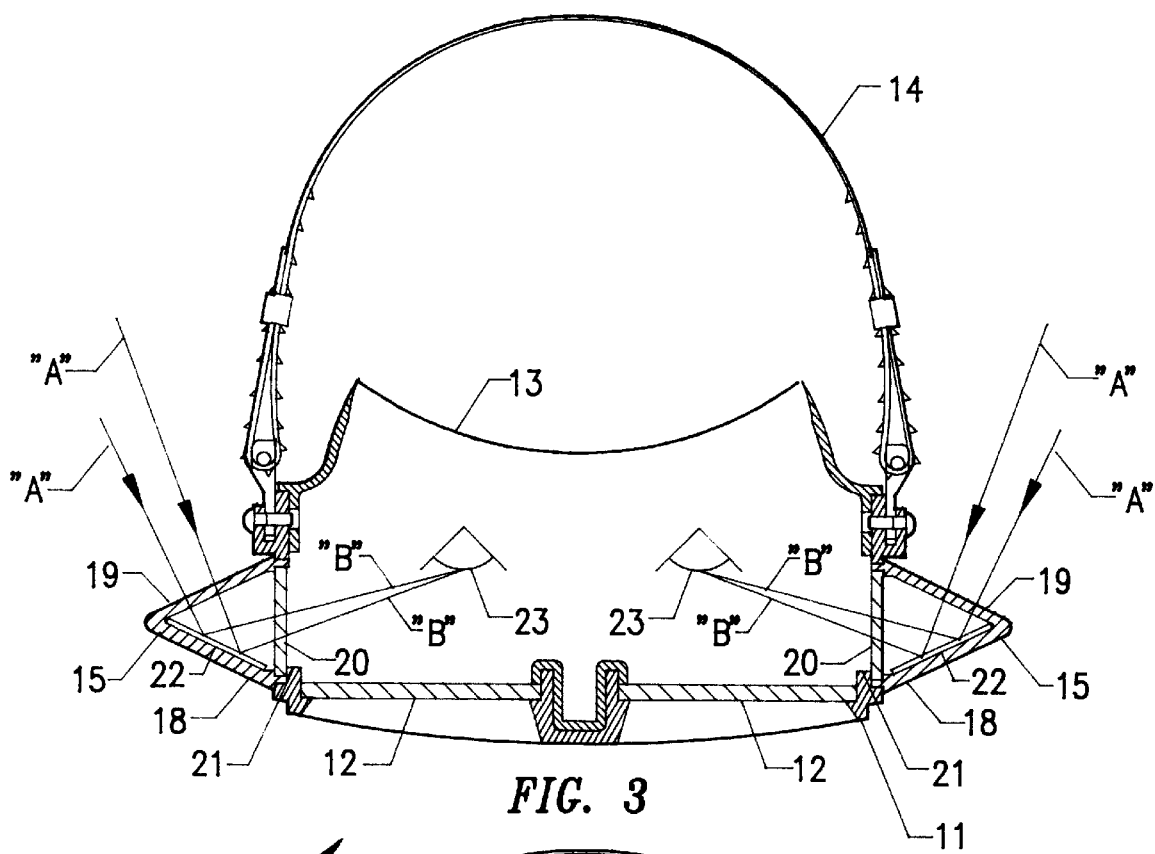
FIG. 3 is a cross-sectional view taken on the line 3—3 in FIG. 2.

Referring now to the drawings wherein like numerals designate like and corresponding parts throughout the several views, a diver's mask 10 having supplementary lateral and posterior fields of vision is shown in FIGS. 1 through 3, inclusive.

The diver's mask 10 generally consists of a frame 11, a pair of transparent lenses 12 mounted in a front portion of the frame 11, a flexible seal 13 bonded to an outer portion of the frame 11 for sealing the mask 10 against a diver's face, an adjustable strap 14 attached to end portions of the frame 11 for mounting the mask 10 on a diver, and a pair of compartments 15 at opposite ends of the frame 11.

Except for the compartments 15 at the ends of the mask 10, the appearance of the mask 10 is conventional. It should be noted, however, that some conventional divers' masks have only a single lens. The construction of the mask 10 is best understood by reference to FIGS. 2 and 3. The compartments 15 resemble triangular prisms having triangular upper 16 and lower 17 walls and intersecting front 18, rear 19 and inner 20 walls. The shape of the compartments 15 is discretionary, the principal requirement being that mirrorized inside surfaces 22 of the compartments 15 reflect incoming light rays into the view of a diver. An inner portion of each compartment 15 extends into an aperture 21 in sealing relationship to the aperture 21.

Inner surfaces 22 of the front walls 18 of the compartments 15 extend outwardly and rearwardly and reflect light rays "A" which enter through the transparent rear wall 19 into the view of a diver. The path of the light rays is shown in FIG. 3 wherein incident rays "A" strike mirrorized surfaces 22 and reflected rays "B" strike eyes 23 of a diver.

Figure 5:
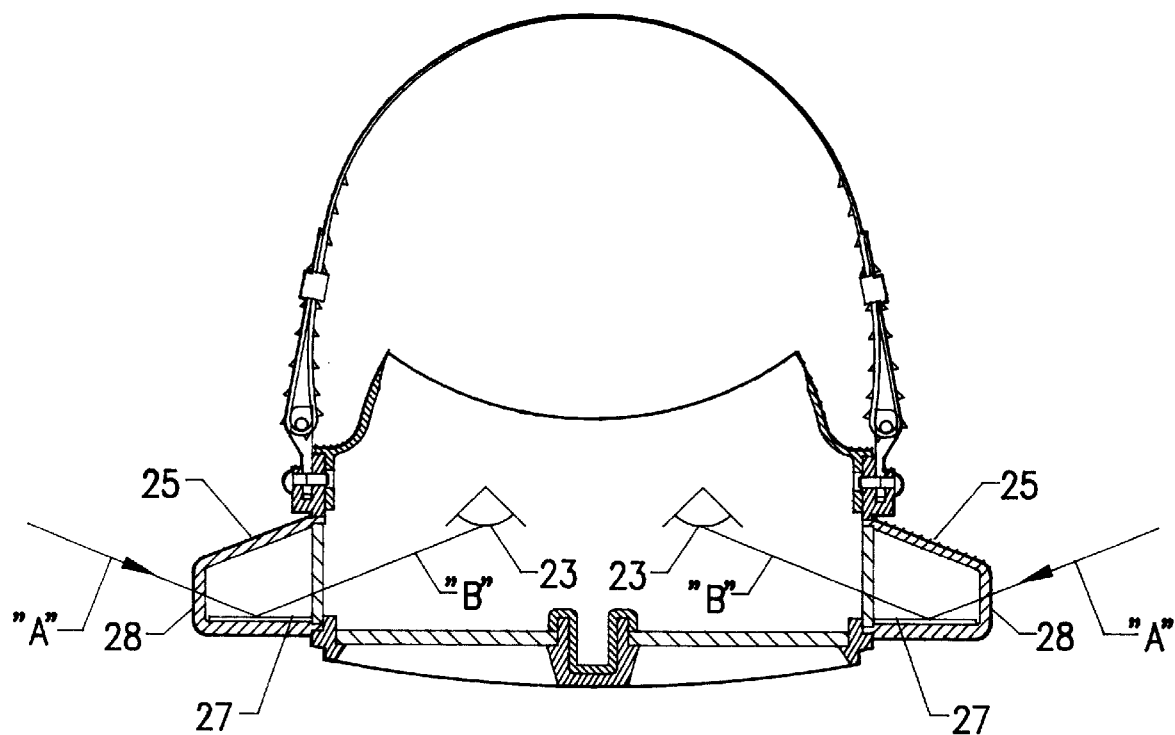
FIG. 5 is a cross-sectional view of a first alternate embodiment taken in the manner of FIG. 3 with sealed compartments for supplementing a diver's lateral and posterior fields of vision.

In FIG. 5 is shown an embodiment having sealed compartments 25 at the ends of a mask 26 with mirrorized surfaces 27 which are parallel to a front of a mask 26 and transparent outer walls 28 through which light rays "A" enter the mask 26.

Figure 6:
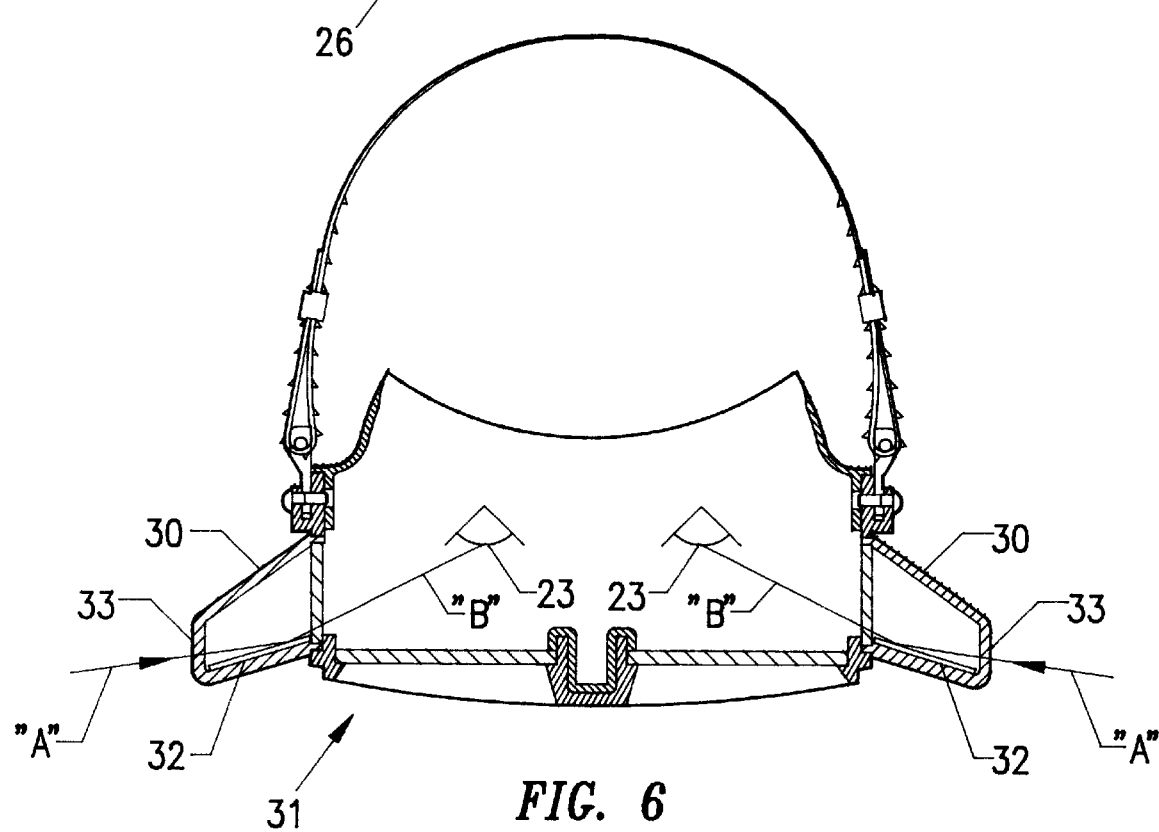
FIG. 6 is a cross-sectional view of a second alternate embodiment taken in the manner of FIG. 3 with sealed compartments for providing supplemental lateral and posterior fields of vision.

In FIG. 6 is shown an embodiment having sealed compartments 30 at the ends of a mask 31 with mirrorized surfaces 32 which extend outwardly and forwardly and transparent outer walls 33 through which light rays "A" enter the mask 31. It will be observed in FIGS. 5 and 6 that the extent of the rearward fields of vision has decreased from the embodiment 10 of FIGS. 1 through 3 whereas the of the lateral fields of vision has increased from said embodiment 10.

Figure 4:
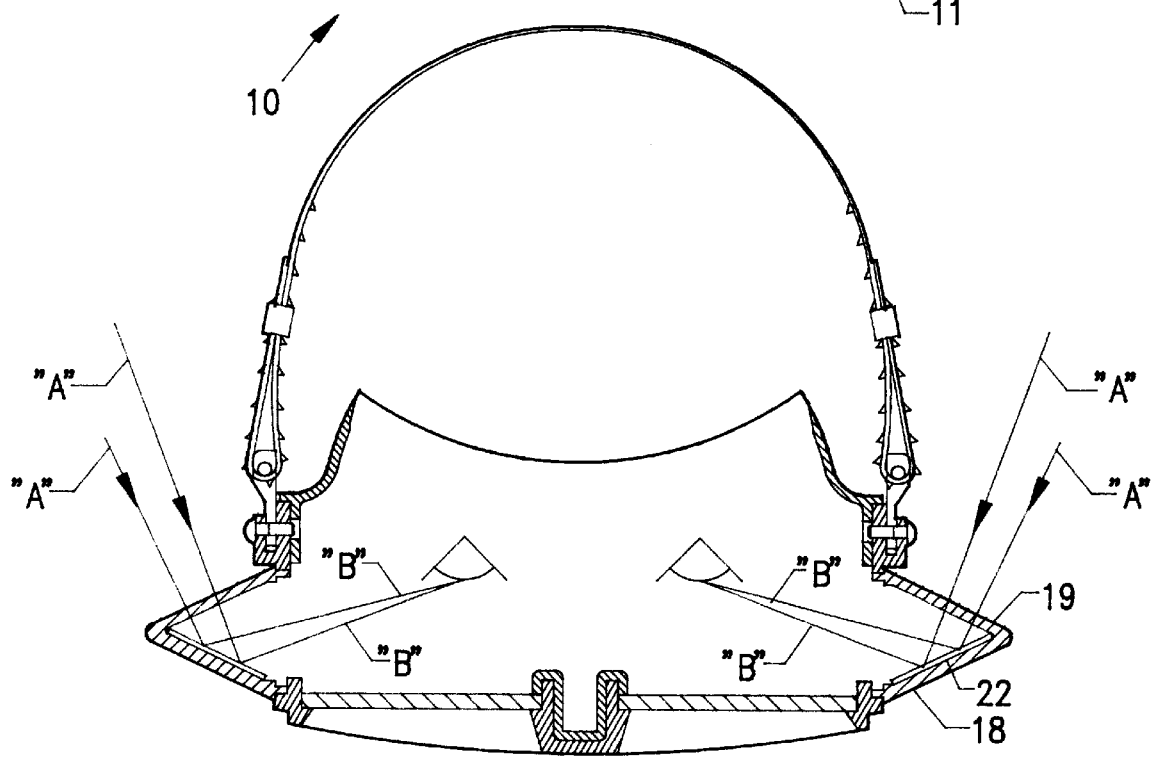
FIG. 4 is a cross-sectional view taken in the manner of FIG. 3 of an embodiment with open compartments for supplementing a diver's lateral and posterior fields of vision.

With reference to FIG. 4, open compartments without inner walls also allow light rays "A" to reflect into a diver's view. However, the sealed water-tight compartments 15 are preferable to preserve the reflectance of the mirrorized surfaces 22 and avoid fogging and necessity of cleaning.

Referring again to FIG. 3, several options are available for mirrorizing the inner surfaces 22 of the front walls 18 of compartments 15. One option is to adhesively apply pieces of thin mirrorized Mylar film. A second option is to plate the surfaces 22 with chromium or aluminum. A third option is to adhesively apply thin pieces of polished stainless or chromium plated steel.

Figure 8:
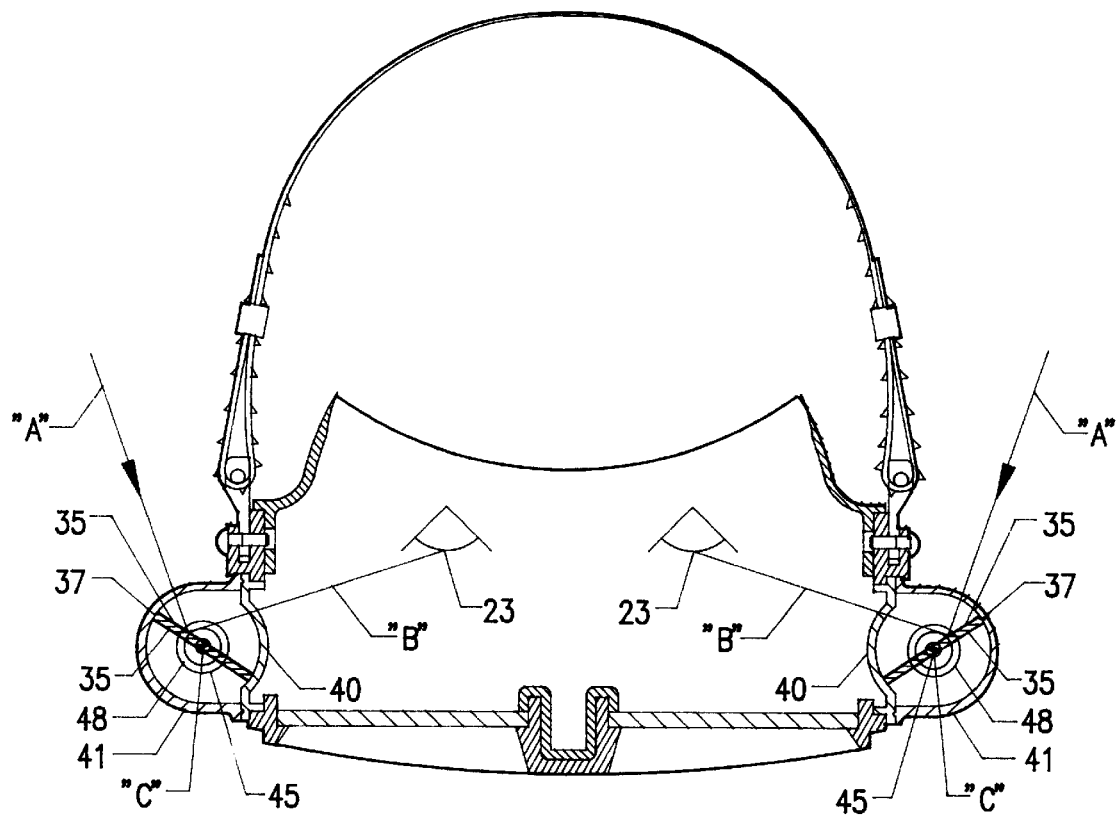
FIG. 8 is a cross-sectional view taken on the line 8—8 in FIG. 7.
Figure 7:
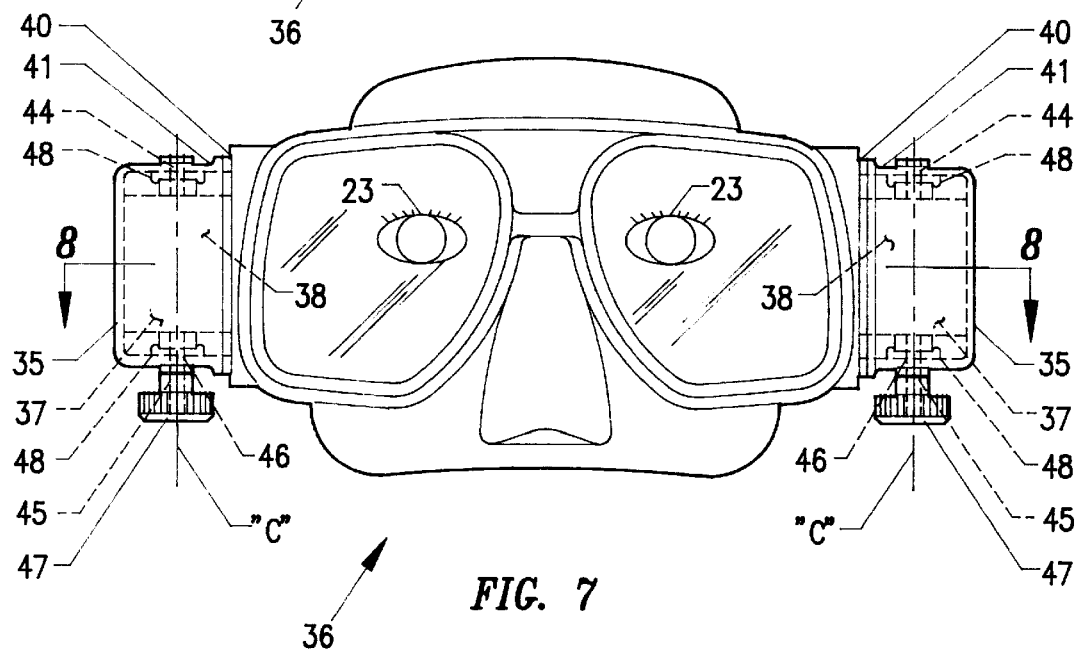
FIG. 7 is a front view of an alternate embodiment which is selectively adjustable for supplementing a diver's lateral and posterior fields of vision.

With reference to FIGS. 7 and 8, an embodiment is shown which is selectively adjustable by a diver about vertical axes to vary supplemental lateral and rearward fields of vision. Generally cylindrical transparent sealed compartments 35 are provided at the ends of a mask 36. In the interior of the compartments 36, rectangular reflectors 37 are pivotally mounted for rotation about vertical axes "C".

Opposite surfaces 38 of the reflectors are mirrorized to reflect light rays "A" which enter the compartments 35 and pass through a transparent inner wall into a diverts view. To install the reflectors, the compartments are divided into inner 40 and outer 41 portions. At upper 42 and lower 43 walls of the reflectors 37, spindles 44, 45 are journalled in apertures 46. The lower spindles 44 extend through the lower walls 43 and attach to circular knobs 47 for rotating the reflectors 37. At the ends of the reflectors 37, seals 48 prevent water from entering the compartments 35.

In FIGS. 9 through 11, an embodiment is shown wherein rectangular reflectors 49 are pivotally mounted in transparent sealed compartments 50 at the ends of a mask 51 for rotation about horizontal axes "D". Opposite mirrorized surfaces 52 on the reflectors 49 reflect light rays "A" which enter the compartments 50 into a diver's eyes 23. The sealed compartments 50 are divided into inner 53 and outer 54 portions to install the reflectors 49.

Spindles 55, 56, are journalled in apertures in front 57 and rear 58 walls of the compartments 49. The forward spindles 55 extend through the front walls 57 and are attached to circular knobs 59 for rotating the reflectors 49 about the horizontal axes "D". Seals 60, 61 at the ends of the spindles 55, 56 prevent water from entering the compartments 49.

Figure 13:
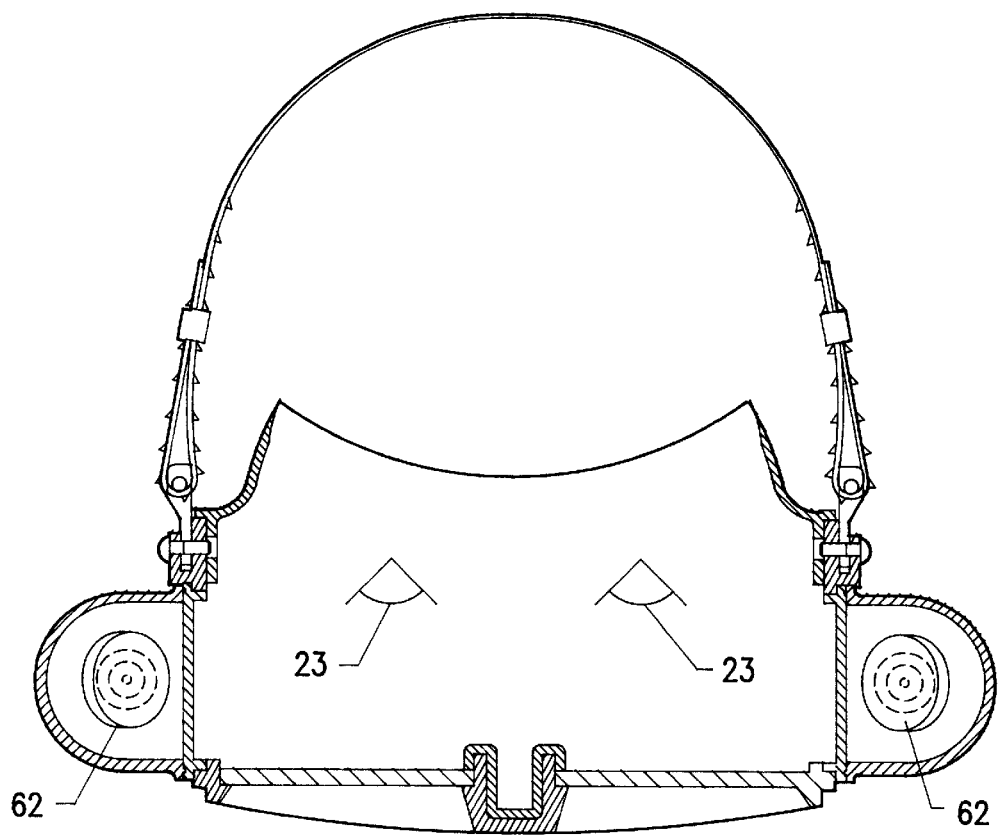
FIG. 13 is a cross-sectional view taken on the line 13—13 in FIG. 12.
Figure 12:
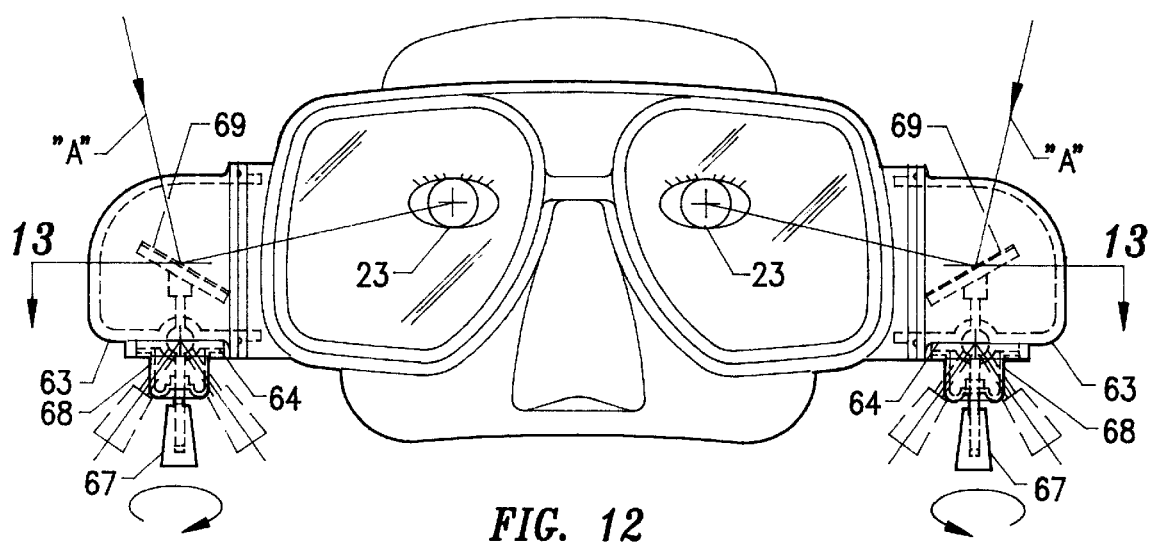
FIG. 12 is a front view of an alternate embodiment which is selectively adjustable for supplementing a diver's vertical, lateral and posterior fields of vision.

In the embodiment of FIGS. 12 and 13, a pair of reflectors 62 are mounted inside sealed transparent compartments 63 on shafts 64 which are attached to lower walls 65 of the compartments 63 with spherical joints 66. The shafts 64 extend out of the compartments 63 and are attached to knobs 67 for rotating the reflectors 62. A seal 68 prevents water from entering each of the compartments 63. A surface 69 of the reflectors 62 is mirrorized to reflect light rays "A" entering the compartments 63 into the eyes 23 of a diver. The positions of the reflectors 62 are selectively adjustable to supplement the diver's vertical, lateral and posterior fields of vision.

Referring now to FIGS. 14 and 15, an embodiment is shown wherein a pair of triangular shaped compartments 70 are detachably mounted on transparent end portions 71 of a diver's mask 72. The triangular compartments 70 have triangular upper 73 and lower 74 walls and rectangular front 75 and rear 76 walls. The rear walls 76 are transparent to allow light rays "A" from objects at the side and rear of a diver to enter the compartments. The inner surfaces 77 of the front walls 75 are mirrorized to reflect the light rays "A" which enter the compartments 70 into the eyes of a diver.

The compartments 70 are retained to the mask with wire retaining members 78. In a vertical portion 79 of each wire retainer 78 is a thumb screw 80 for attaching and removing the compartments 70 from the mask 72. Rubber seals 81 at the inner portions of the compartments 70 prevent water from entering the compartments 70.

From the foregoing it will be appreciated that my invention provides an effective means for supplementing a diver's vertical, lateral and posterior fields of vision. Eye movements and twisting and turning of a diver's head and body are substantially reduced and in some cases eliminated.

Although but several embodiments of my invention have been described, it will be appreciated that other embodiments can be derived by substitution and changes in material, shape, and arrangement of parts without departing from the spirit thereof.

I claim:

1. In combination with a diver's mask having a frame, said frame having transparent side wall portions for attaching a pair of detachable sealed compartments and a front portion for receiving a lens, and a transparent lens mounted in said front portion for admitting light rays from objects in front of a diver; a pair of hollow mirrorized compartments, each of said compartments having a transparent wall portion for admitting light rays into said comparment, a wall portion having a fixed mirrorized surface for reflecting light rays entering said compartment through one of said frame's transparent side wall portions from objects at the rear and side of said mask into said diver's view; a means for clamping said compartments on opposite side portions of said mask; a seal joined to a perimeter of said mask for sealing said mask against a face of said diver; and a strap having end portions attached to end portions of said frame for mounting said mask on said diver.

2. The mask as recited in claim 1 wherein each of said compartments is a sealed compartment.

3. The mask as recited in claim 1 wherein said mirrorized surfaces on said walls of said compartments are positioned to be parallel to said front portion of said mask.

4. The mask as recited in claim 1 wherein said mirrorized surfaces on said walls of said compartments are positioned to extend outwardly and rearwardly from said opposite side portions of said mask.

5. The mask as recited in claim 1 wherein said mirrorized surfaces on said walls of said compartments are positioned to extend outwardly and forwardly from said opposite side portions of said mask.

6. In combination with a diver's mask having a frame, said frame having a front portion for receiving a lens, a transparent lens mounted in said frame's front portion for admitting light rays from objects in front of a diver and a transparent side wall portion; at least one detachable hollow mirrorized sealed compartment, said hollow compartment having a first transparent wall portion for admitting light rays into said compartment from objects at the rear and side of said diver, an adjoining wall portion having a mirrorized surface for reflecting said light rays into said diver's view, and a second adjoining transparent wall portion for admitting said light rays entering through said mask's transparent side portion and reflected from said mirrorized surface into an interior portion of said mask; a means for clamping said sealed compartment to said transparent side portion of said mask; a seal joined to a perimeter of said mask for sealing said mask against a sealing said mask against a face of said diver; and a means for attaching said mask to said diver.

7. The mask as recited in claim 6 wherein said mirrorized surface extends outwardly and rearwardly when said compartment is clamped on said side portion of said mask.

8. In combination with a diver's mask having a front portion for receiving a lens and adjoining opposite transparent side wall portions; at least one detachable sealed hollow compartment clamped on one of said transparent side wall portions of said mask, said hollow compartment having an interior portion for receiving a reflector, a first transparent wall portion for allowing light rays to enter said interior of said compartment and a second transparent wall portion for allowing light rays from said interior of said compartment to enter said mask through one of said mask's transparent side portions; a reflector mounted for rotation in said interior of said compartment, said reflector having at least one mirrorized surface for reflecting said light rays entering said compartment through said compartment's second transparent wall portion and said mask's transparent side portion into a diver's view; a knob which is attached to said reflector, said knob having a portion which is exterior to said compartment for enabling said diver to selectively rotate said reflector to enlarge said diver's field of vision in varying amounts; a means for detachably clamping said compartment on said mask; and a seal joined to a perimeter of said mask for sealing said mask against a face of said diver; and a means for attaching said mask to said diver.

9. The diver's mask recited in claim 8 wherein said reflector is rotatable about a vertical axis.

10. The diver's mask recited in claim 8 wherein said reflector is rotatable about a horizontal axis.

11. The diver's mask recited in claim 8 wherein said reflector is rotatable about a spherical joint.

12. A method for enlarging a diver's field of vision comprising the steps of: clamping at least one detachable hollow compartment on a transparent side portion of a diver's mask, said hollow compartment having a transparent wall portion for admitting light rays from objects at the sides, rear, above and below said diver and an adjacent mirrorized wall portion for reflecting said admitted light rays into said diver's eyes; admitting said light rays from said objects at the sides, rear, above or below said diver into said hollow compartment, reflecting said light rays off of said mirrorized wall of said compartment; passing said light rays through said mask's transparent side portion into said diver's eyes.

13. The method as recited in claim 12 further comprising the step of rotating said mirrorized surface to adjust said diver's field of vision.

14. The method as recited in claim 12 wherein said mirrorized surface is rotated about a vertical axis.

15. The method as recited in claim 12 wherein said mirrorized surface is rotated about a horizontal axis.

16. The method as recited in claim 12 wherein said light rays are reflected from said mirrorized surface which is substantially parallel to said front portion of said mask.

17. The method as recited in claim 12 wherein said light rays are reflected from said mirrorized surface which extends forwardly and outwardly from said side portion of said mask.

18. The method as recited in claim 12 wherein said light rays are reflected from said mirrorized surface which extends rearwardly and outwardly from said side portion of said mask.

\* \* \* \* \*

UNITED STATES PATENT AND TRADEMARK OFFICE
CERTIFICATE OF CORRECTION

PATENT NO.   : 5,980,035
DATED        : Nov. 9, 1999
INVENTOR(S)  : Joseph J. Berke It is certified that error appears in the above-indentified patent and that said Letters Patent is hereby corrected as shown below:

On the title page, item [54] and Column 1,
   In the Title, change "DRIVER'S" to --DIVER'S--

Column 1, line 33, change "for" to --with--

Column 3, line 26, after "whereas the" add --extent--

Column 3, line 50, change "diverts" to --diver's--

Signed and Sealed this

Eighteenth Day of July, 2000

*Attest:*

Q. TODD DICKINSON

*Attesting Officer*     *Director of Patents and Trademarks*